E. HALLEY.
VALVE.
APPLICATION FILED MAR. 5, 1906.
921,981.
Patented May 18, 1909.
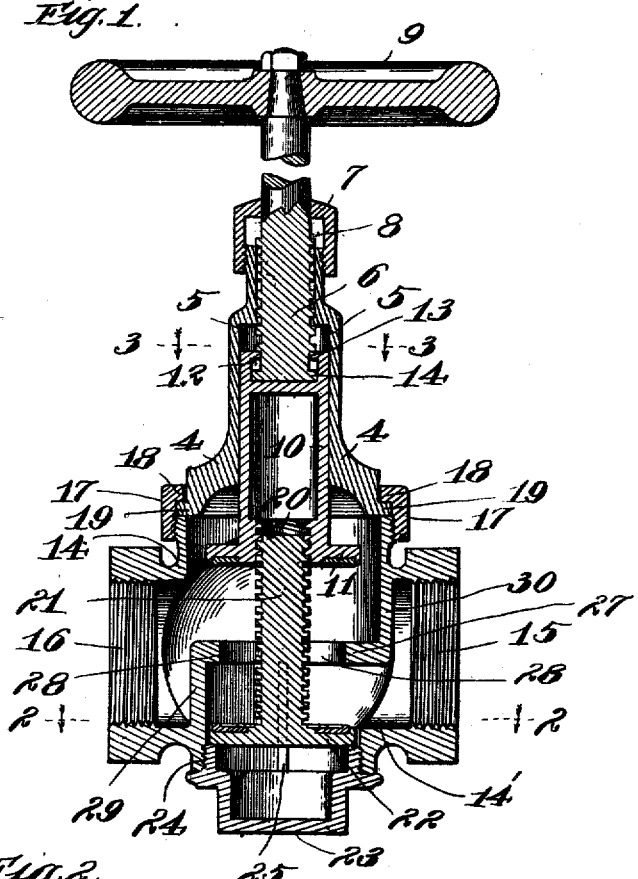
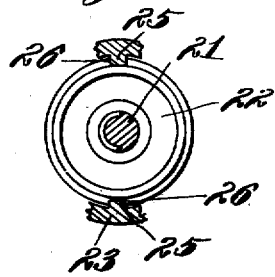
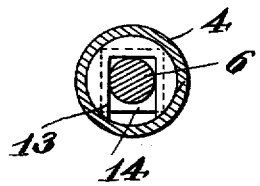
Witnesses.
Inventor
Edward Halley
By
Atty

UNITED STATES PATENT OFFICE.

EDWARD HALLEY, OF CHICAGO, ILLINOIS.

VALVE.

No. 921,981.     Specification of Letters Patent.     Patented May 18, 1909.

Application filed March 5, 1906. Serial No. 304,279.

*To all whom it may concern:*

Be it known that I, EDWARD HALLEY, a citizen of the United States, residing at Chicago, Cook county, Illinois, have invented certain new and useful Improvements in Valves, of which the following, taken in connection with the drawing, is a specification.

My invention has for its object the production of a valve designed for use more particularly to control steam passages, and consists in the combination of certain parts as hereinafter described.

In the accompanying drawings forming part of this specification, and in which like reference numerals indicate like or corresponding parts, I have shown one form of device illustrating the principle of my invention, although the same might be carried into effect in other ways without departing from the spirit of my invention, and in these drawings, Figure 1 is a vertical sectional view of my invention; Fig. 2 is a transverse section taken on line 2—2 of Fig. 1; and Fig. 3 is a transverse section taken on line 3—3 of Fig. 1.

In carrying out the invention 4 is the valve bonnet which has an opening 5 therein, the top of said opening being of smaller diameter than the bottom as shown in the drawing. 6 is the upper valve rod extending into said opening 5. A screw-cap 7 surrounds said rod 6 and engages said bonnet 4, and forms in conjunction therewith a stuffing box 8, which in operation may be filled with lubricating material.

9 is a hand wheel which is secured to the end of the upper valve rod 6 and by means of which said rod is operated.

There being two valve heads in this construction I shall use the terms "upper" and "lower" to distinguish them as it does when the valve is in the position shown in the drawing, although as is obvious the valve may be used in a vertical pipe, in which said valve would be in a horizontal position.

An annular sleeve 10 is disposed inside of the bonnet 4 and carries upon the end thereof the upper valve head 11. In the upper end of the sleeve 10 is a recess 12, having an inwardly projecting shoulder 13. The end of the valve rod 6 is provided with a square or angular shoulder 14, which is disposed inside of the recess 12, and which in operation has a slight vertical movement regulated by the shoulder 13. The valve rod 6 is screw threaded the greater portion of its length as illustrated in Fig. 1.

14 is the valve body having an inlet passage 15 and an outlet passage 16. The valve body 14ª and the bonnet 4 are held in contact with each other by means of the collar 17, which forms a screw threaded engagement with the valve body 14ª, and which collar is provided with an inwardly projecting shoulder 18 which takes over a corresponding outwardly projecting shoulder 19 on the valve bonnet 4.

The annular sleeve 10 is provided at the lower end thereof with an interiorly screw threaded bore 20, of smaller diameter than the sleeve proper. 21 is the lower valve rod which is exteriorly screw threaded and engages the screw threaded bore 20 in the annular sleeve 10. The lower valve head 22 is carried by or made integral with the valve rod 21. The pitch of the screw threads on the rod 21 is twice the pitch of the threads on the valve rod 6. A cap 23 incloses the lower part of the valve body 14ª and is secured thereto by screw threaded engagement 24. Extending upwardly upon two sides of said cap are the ribs 25, which extend into grooves 26 upon each side of the valve head 23, and act as guides therefor in the operation of the valve.

27 is a double faced valve seat extending approximately through the center of the valve body 14ª. 28 is an opening which extends through the valve seat 27, and is adapted to be closed upon either side thereof with the valve heads 11 and 22. The valve seat 27 is supported inside of the body 14ª by the walls 29 and 30, which, except for the opening 28, form a complete partition between the inlet passage 15 and outlet passage 16.

The operation of the valve is as follows: As shown in the drawing the valve is open. When it is desired to close the same, the hand wheel 9 on the valve rod 6 is turned and by means of the square or angular shoulder 14 in the recess 12 of the sleeve 10, said sleeve carrying the valve rod 11 travels downwardly on the valve rod 21. The valve head 22 being keyed to the inner casing is prevented from rotating, but is permitted to move vertically which it does as the sleeve 10 moves downwardly over the rod 21. The distance between the valve head 22 and the lower face of the valve seat 27 being less than the distance between the upper valve head and the upper face of the valve seat 27, the valve 22 is brought into contact with the valve seat 27 in advance of the valve 11, which is then brought to rest upon the seat 27 thereby tightly closing over the opening 28 in the valve seat, and very effectually cutting off the escape of any steam therethrough.

I claim:

In a valve, the combination of a valve casing, a two-faced valve seat supported in said casing, a valve stem comprising an upper, central and lower section movably secured together, the lower section being screw threaded into the central section at one end and having the lower valve head upon the opposite end thereof, the upper valve head carried by the central section, and means for operating the valve stem to simultaneously open or close said valves upon opposite sides of the aforesaid seat, substantially as described.

In testimony whereof I have signed this specification in the presence of two subscribing witnesses.

EDWARD HALLEY.

Witnesses:
C. F. AMES,
C. S. CORNING.